UNITED STATES PATENT OFFICE.

HUGO VON PERGER, OF REICHENBERG, BOHEMIA, AUSTRIA-HUNGARY, ASSIGNOR TO THE SOCIETY OF CHEMICAL INDUSTRY, OF SAME PLACE.

PRODUCTION OF PHENYL-METHYL OXYQUINICINE.

SPECIFICATION forming part of Letters Patent No. 348,483, dated August 31, 1886.

Application filed June 10, 1886. Serial No. 204,743. (Specimens.)

*To all whom it may concern:*

Be it known that I, HUGO VON PERGER, a citizen of Austria, residing at Reichenberg, Bohemia, in the Empire of Austria-Hungary, have invented new and useful Improvements in the Manufacture of Derivatives of Quinicine by the action of Hydrazobenzole upon Acetylacetic Ether, of which the following is a specification.

This invention relates to the production of derivatives of quinicine by the action of hydrazobenzole upon acetylacetic ether.

In carrying out my invention I proceed as follows: Ten parts, by weight, of hydrazobenzole are heated with ten to fifteen parts, by weight, of acetylacetic ether during the space of four or five hours at from 90° to 130° centigrade. After cooling, the melt is repeatedly boiled out with diluted muriatic acid. The liquids are neutralized by the addition of ammoniac. The thus separated crystalline mass is collected on a filter, and dissolved in strongly-diluted boiling sulphuric acid and filtered. Upon cooling the raw phenyl-methyl oxyquinicine crystallizes, and can be obtained in the pure state by repeated crystallization from water and ether. The new compound is obtained in the form of beautiful white crystals, which melt at 122° centigrade. When hydrazobenzole is substituted by its derivatives or its homologues, and when instead of acetylacetic ether its substitution-products are used, a series of new bodies is obtained, which show the same qualities as the phenyl-methyl oxyquinicine.

What I claim as new and original, and desire to secure by Letters Patent, is—

The production of phenyl-methyl oxyquinicine by the action of hydrazobenzole upon acetylacetic ether.

In testimony whereof I have hereunto set my hand and seal in the presence of two subscribing witnesses.

HUGO VON PERGER. [L. S.]

Witnesses:
EDWARD PFEIFER,
WILH. FEISTING.

It is hereby certified that the residence of the assignee in Letters Patent No. 348,483, granted August 31, 1886, upon the application of Hugo von Perger, of Reichenberg, Bohemia, Austria-Hungary, for an improvement in Production of Phenyl-Methyl Oxyquinicine, was erroneously written and printed "of same place," whereas said residence should have been written and printed *Basle, Switzerland;* and that the said Letters Patent should be read with this correction therein that the same may conform to the record of the case in the Patent Office.

Signed, countersigned, and sealed this 12th day of October, A. D. 1886.

[SEAL.]
                      D. L. HAWKINS,
                      *Acting Secretary of the Interior.*

Countersigned:
    R. B. VANCE,
        *Acting Commissioner of Patents.*